United States Patent Office 3,377,461
Patented Apr. 9, 1968

3,377,461
ARC WELDING METHOD AND COATED ELECTRODE
John T. Ballass, Troy, Ohio, and Carl W. Perkins, Jr., Norwich, and Bernard J. Freedman, Groton, Conn., assignors to General Dynamics Corporation, New York, N.Y., a corporation of Delaware
No Drawing. Continuation-in-part of application Ser. No. 196,004, May 18, 1962. This application Aug. 5, 1965, Ser. No. 477,590
13 Claims. (Cl. 219—146)

A weld wire comprising a clean consumable wire electrode of high strength low alloy steel and having a coating which is substantially continuous, moisture-free, flexible, and which imparts substantially no hydrogen to the weld is disclosed. The coating may be a mixture of chlorinated rubbers and chlorinated resins or a mixture of chlorinated rubber and chlorinated paraffin. A method of making the coated wire and a method of welding are also disclosed.

This application is a continuation-in-part of our copending application Ser. No. 196,004, filed May 18, 1962 now abandoned.

This invention relates to an improved method for welding low alloy high strength steels. The invention also relates to a method for coating welding wire and the resulting product.

Low alloy steels are carbon steels containing other elements in small amounts to impart a particular property or combination of properties thereto. Alloying elements commonly used include nickel, chromium, molybdenum, vanadium and silicon.

A number of low alloy nickel-bearing high tensile strength steels with many excellent characteristics have been developed for use both for armor plate and in the construction of units such as naval vessels which are subjected to unusually high stresses.

Welding of low alloy high strength steels is less easily accomplished than with plain carbon steels. However, by the use of a suitable filler metal and by preheating the workpiece, a suitable weld can be obtained.

Preheating of the workpiece requires that it be heated to from 200 to 500° F. before the welding process commences. Preheating of large workpieces is particularly difficult and adds considerably to the expense of the welding operation. In the construction of naval vessels, for example, where large sections are to be joined, a number of small electric area heaters must be placed along the path which the welding machine is to follow and must be used for all welding techniques, including submerged arc welding, manual metal arc welding and inert gas-shielded metal arc welding. In some instances, complete enclosures must be built around the preheated areas of the workpiece to prevent rapid heat loss.

While preheating is an obviously uneconomical practice, it is invariably used because, in its absence, the welds produced are defective. The defects are evidenced in the form of "hydrogen" cracks which are found in the cooled article in areas of the base plate immediately adjacent the welding site. These cracks are in the form of small hair-like fissures in the base metal immediately adjacent to the metal deposited by the welding operation.

While this phenomenon is not fully understood, it is believed that the cracking is caused by hydrogen gas which has been released during welding and becomes entrapped in the softened metal. Apparently, the heat supplied by the preheating step together with the heat applied during the welding operation leaves sufficient residual heat to permit dissipation of the hydrogen gas before it can be confined by the cooling metal to form a cavity.

It also appears that "hydrogen" crack formation bears some relationship to the amount of hydrogen found in or added to the molten weld metal during welding. For example, the use of copper-coated welding wires will often cause cracking unless suitable preheating temperatures are used, the copper coating apparently contributing an excessive amount of hydrogen to the welding site.

It has now been found that low alloy high strength steels can be welded with little preheating, i.e., about 100° F. or less, or without preheating, i.e., approximately 75° F., to form a weld which is free from hydrogen cracking. This desirable result with substantially no preheating is obtained by closely following the method steps listed below:

(1) The filler metal, after being placed in a useable form, such as welding wire to be used as a consumable electrode, is thoroughly cleaned of surface impurities and irregularities.

(2) All traces of water must be removed from the filler metal and the filler metal must be coated with a thin coating of a material which is sufficiently flexible to maintain a continuous film under normal storage conditions, which must prevent contamination of the filler metal by water or other hydrogen-containing materials, and further, which must itself decompose during welding in such a manner that it imparts no hydrogen to the weld site.

(3) Finally, the filler metal coated as indicated above, must be applied by a direct current reverse polarity welding technique, and the flux used must be of the air-quenched type.

By following each of the critical considerations set forth above, low alloy high strength steels may be joined by welding while the workpiece or base plate is initially at ambient temperatures. High quality welds free from hydrogen cracking are thus obtained without the necessity of a preheating step.

HY–80 steel, which is an exemplary high strength low alloy steel having a yield strength between 80,000 and 100,000 pounds per square inch, has the following chemical composition:

| Element: | | Percentage by weight |
|---|---|---|
| Carbon | max | .22 |
| Manganese | | .1 to .4 |
| Phosphorus | max | .035 |
| Sulfur | max | .04 |
| Silicon | | .15 to .35 |
| Nickel | | 2.0 to 2.75 |
| Chromium | | .9 to 1.4 |
| Molybdenum | | .23 to .35 |
| Balance Fe. | | |

The complete specification of HY–80 steel may be found in U.S. Government Specification MIL–S–16216D (NAVY). Other typical high strength low alloy steels that may be welded advantageously by the method of this invention include STS steel and T-steel, the latter being designated by U.S. Steel as plate steel T–1. These and other low alloy high strength steels typically contain 0.15 to 0.3% carbon and 2 to 5% of other alloying elements.

FILLER

Various types of filler metal may be used according to this invention, the precise composition depending upon the composition of low alloy high strength steels to be joined.

After the filler metal has been prepared, it is placed in a useable form such as a consumable welding wire. The billets of filler metal should be cropped and otherwise handled to eliminate all pipes and voids. The billet is converted to welding wire at a temperature between 1700 and 1900° F. to prevent cracking. The hot coils are examined to assure that there has been no segregation carried over from the billet and the hot coils then are annealed and pickled in the usual manner.

WELDING WIRE

After formation of the welding wire, it is cleaned to remove all surface defects and to provide a clean metal surface substantially free from surface irregularities.

A preferred method of cleaning the wire employs rotary-type sanding units, each component of which consists of eight equally spaced brush-backed abrasive paper strips. The components are arranged so that four complete quadrants of the wire are simultaneously abraded with a striking angle of 90° to the long axis of the wire. Off spooling and final coiling of the wire is maintained consistently in the same plane to avoid electrode cast.

Following the coarse abrasive treatment, the wire is passed through steel wool under sufficient pressure to insure removal of the slight circumferential burs produced in the abrasive operation.

Following this treatment and in preparation for applying a coating, the wire is then treated with ethyl alcohol, substantially anhydrous in form, to remove traces of water and abrasive and then with toluene or xylene to remove residual alcohol. The wire is treated with the solvents by successively passing them through a doubled cellulose sponge containing the respective solvent. The sponge is pressed against the wire to achieve a wiping effect.

Following the solvent treatment, the wire is then immediately passed through additional cellulose sponges saturated with the coating solution.

In accordance with an alternate procedure, the wire is cleaned by placing it in an aqueous solution of a complexing agent or of a chelating agent, preferably one in the neutral pH range. The solution removes water soluble wire-drawing lubricants and hydrated scale. Examples of suitable solutions are those containing citric acid, nitrol acetic acid, ethylene diamine tetraacetic acid and glycolic acid.

The effectivenes of these solutions varies with time and temperature of treatment and with the concentration of agent in solution. One preferred solution contains 28% sodium or ammonium citrate in water. At 150° F., from 10–15 minutes of treatment are required for ordinary wire, and up to one hour may be required if scaling is bad. Shorter times of treatment are required at 200° F.

Following treatment with the complexing or chelating agent in solution, the wire is rinsed and dried. Best results are obtained if the wire is dipped in anhydrous ethyl alcohol to insure complete removal of the water prior to application of the coating solution.

COATING METHOD

A number of considerations must be followed in determining the appropriate coating material. The coating solution should have a low viscosity and be a fast drying one component system. The resulting film should protect the welding wire from erosion in outdoor weathering. No toxicological problems should result from the use of the coating during the welding operation. The film should burn off quickly and leave no residue which would adversely affect the weld. The coating must be sufficiently thin to avoid insulating the electrical contacts and should not gum up the welding machine.

In accordance with one embodiment of this invention, a mixture of chlorinated rubbers and chlorinated resins may be employed as a coating film. An alternative and preferred coating is obtained with a mixture of a chlorinated natural rubber and a chlorinated paraffin. These coating compositions are preferably applied from a mixed solvent solution containing xylene and toluene, although any hydrocarbon that can be a solvent vehicle for the coating ingredients is suitable.

Exceptionally fine results have been obtained using a coating composition comprising three parts by weight of Parlon, a chlorinated natural rubber, 70% chlorinated, and one part by weight of Clorafin, a chlorinated paraffin which is 40% chlorinated. Parlon and Clorafin are trade names of the Hercules Powder Company.

The coating material is applied from solvent solutions containing from 1 to 7% by weight of coating solids. The preferred range of solid contents for small diameter solid bare wire electrodes of 0.030 inch to 0.060 inch diameter is about 1.5 to 2.5% solids. When applied by the wipe-on technique described in Example I below, a solution containing 1.5 to 2.5% coating solids provides a coated electrode having optimum ease of weld and maximum freedom from clogging or contamination of the torch.

After coating with the coating solution, the wire passes through a hot-air blower to insure complete drying of the coating and is then placed on a spool. For storage purposes, the spool of wire is wrapped in two layers of polyethylene and packaged with a desiccant.

REVERSE POLARITY WELDING

The workpiece or base plate to be welded is prepared in the normal manner, as by cleaning, flame-cutting and beveling the edges to be joined. No preheating is required, although a direct current reverse polarity welding technique must be used. In this method, the consumable electrode or welding wire is the positive pole and the workpiece is the negative pole. Regardless of whether inert gas-shielded metal arc or submerged arc welding techniques are employed, excellent results are achieved.

The following example illustrates a preferred embodiment of the method of this invention.

Example I (A) A filler metal was prepared to have the following chemical composition in weight percent:

| Element | Level |
|---|---|
| Carbon | .10 |
| Sulfur | .007 |
| Phosphorous | .010 |
| Aluminum | .012 |
| Titanium | .002 |
| Zirconium | .08 |
| Manganese | 1.38 |
| Silicon | .64 |
| Nickel | .98 |
| Chromium | .02 |
| Copper | .48 |
| Molybdenum | .29 |

Other impurities did not exceed 0.50 total and 0.15 individually. The balance of the composition is iron.

Before forming the billets into wire, the billets were cropped to remove all pipes and voids and removal of all pipes was verified by ultrasonic examination. The billets were converted into 9/32 inch diameter wire at 1900° F. and the hot coil examined at both ends by etching to assure that no segregation had carried over from the billet. The hot coil was annealed, pickled, and cooled. Following cooling, a thin copper coating was applied to the wire by electroplating techniques. A portion of the copper-coated welding wire was utilized without further treatment.

(B) A second portion of the wire prepared in A above was further treated by removing the copper coating by chemical means and thereafter cleaning and coating the wire in accordance with this invention. The wire was first abrasively cleaned by passing it through a Sand-O-Flex, Model 550A sander, the equipment being available from Merit Products, Inc., Culver City, Calif. The sander had eight individual sanding components, each component being a rotary fixture having eight equally-spaced brush-backed abrasive paper strips. The components were arranged so that four complete quadrants of the wire were simultaneously abraded with a striking angle at 90° to the long axis of the wire. The first group of four components employed 80 grit abrasive paper, and the second group of four used 120 grit abrasive paper. The speed of wire travel through the units was 10 feet per minute. Rotation of the sanding units was 800–900 r.p.m. A bright metal surface was obtained on the wire.

The wire was then immediately passed through doubled pads of grade O steel wool, held together by tight, vise-grip pressure, to remove sharp burs and other surface irregularities remaining on the wire from the sanding process.

The wire was then passed through two cellulose sponges, 3 x 6 x 12 inches, held together in a metal box by moderate pressure. The sponges were saturated with substantially anhydrous ethyl alcohol. This step removed residual moisture and traces of metal and abrasive products left from the earlier treatment. The wire next was passed through a similar sponge unit, nearly saturated with a transition solvent, toluene. This unit removed traces of alcohol and dirt remaining on the wire.

A third cellulose sponge unit containing a solution of mixed chlorinated rubbers and chlorinated resins in xylene and toluene was next provided and the wire passed through it. The coated wire was then dried with hot air blowers. Off-spooling and final coiling was done in the same plane to avoid electrode cast. Coils of the coated wire were sealed with a desiccant in packages comprising two layers of polyethylene.

Welding wire A, with a copper coating, and welding wire B, with the above-described coating were tested under substantially identical welding conditions. Two inch thick plates of HY–80 low alloy high strength steel were welded by submerged arc welding procedures using 60,000 joules per inch heat input and a direct current, reverse polarity welding technique. The joint was at the double V type and an air-quenched flux was used. When welding wire A was used, a preheat and interpass temperature of 100° F. was employed, while with wire B, a preheat and interpass temperature of 75° F. was used. Approximately 26 beads were applied with each wire, and the temperature of the weld area was returned to the interpass temperature before applying the next successive bead.

The heat affected zone of each plate was examined on completion of the weld. The heat affected zone of the plate welded with wire A showed a significant amount of hydrogen cracking while the similar zone of the plate welded with wire B was completely free of the deleterious cracks. In addition, the following characteristics of the respective welds were observed:

TABLE I

| Welding Wire | Plate Thickness | Yield Strength 0.2% offset, p.s.i. | Percent Elongation, Based on 4D Where D=Test Bar Diameter | Charpy V-Notch Impact Toughness (Impact Energy, ft.-lbs.) at −80° F. |
|---|---|---|---|---|
| A | 2 in. | 95,750 | 19 | 25 |
| B | 2 in. | 98,050 | 21 | 36 |

Example II

A filler metal having the composition set forth in Example I was prepared as billets, formed into wire and coated with copper in the manner described in Example I above. A portion of the copper-coated wire was utilized without further treatment. A second portion of the wire was further treated by removing the copper coating by chemical means, and by thereafter cleaning and coating the wire in accordance with the process described in Section B of Example I above. However, instead of the coating mixture used in Example I, a coating comprising 3 parts by weight of Parlon, a chlorinated natural rubber, 70% chlorinated, and 1 part by weight of Clorafin, a chlorinated paraffin, 40% chlorinated, was used. Parlon and Clorafin are trade names of the Hercules Powder Company. The coating mixture was applied in a solvent solution comprising equal parts by weight of xylene and toluene, the solution containing about 2.5% coating solids.

Welds were then made under substantially identical welding conditions, using the copper-coated wire in one series of welds and the wire coated in accordance with our invention in another series. Welds were made in 2 inch thick plates HY–80 low alloy high strength steel of the same heat using the submerged arc welding process and an air quenched flux. Each weld was made using the same heat input of 60,000 joules per inch and a direct current reverse polarity welding technique. The weld type was double bevel 55° butt joint. A 100° F. preheat and interpass temperature was used. Duplicate welds were made and the welds were evaluated by determining the number of cracks observed in the completed welds. The results are summarized in the following table:

Weld W: Copper-coated wire __ 48 cracks in 24″ of weld.
Weld X: Copper-coated wire __ 44 cracks in 24″ of weld.
Weld Y and Weld Z:
    Wire coated with mixture
      of chlorinated rubber
      and chlorinated paraffin _____ No cracks.

The absence of cracks in welds Y and Z is a significant improvement.

While this invention has been described in terms of a welding wire, it will be understood that the advantages are similarly obtained where the filler metal is formed in the shape of rods or strips of varying cross-section.

We claim:

1. In a method of electrically welding low alloy high strength steel by fusion-deposition from a weld wire, the improvement comprising the use of a clean consumable wire electrode of low alloy high strength steel filler metal, the electrode having a moisture-free, flexible surface coating of a mixture of chlorinated rubbers and chlorinated resins, feeding the electrode towards a workpiece while maintaining an arc between the end of the electrode and the workpiece with direct current reverse polarity electrical energy, and maintaining the arc under a blanket of inert shielding gas, the welding being conducted with little or no preheating of the workpiece.

2. A metallic weld wire comprising a clean consumable wire electrode having on the surface thereof a substantially continuous moisture-free flexible coating of material which imparts substantially no hydrogen to a weld during welding, the material comprising a mixture of chlorinated rubber and chlorinated paraffin.

3. A method of preparing a weld wire for welding high strength low alloy steel comprising the steps of forming a high strength low alloy steel filler metal into wire, abrasively cleaning the wire surface to remove surface impurities, removing surface irregularities from the wire, removing residual moisture from the wire with substantially anhydrous ethyl alcohol, removing residual ethyl alcohol from the wire with toluene, applying to the wire surface, by wiping, a coating solution comprising a substantially anhydrous xylene-toluene solution of mixed chlorinated rubber and chlorinated paraffin thereon, and removing the xylene and toluene by drying to provide a moisture-free flexible continuous coating.

4. The method of claim 3, wherein the coating solution contains from about 1.5 to about 2.5%, by weight, of coating solids.

5. In a method of electrically welding low alloy high strength steel by fusion-deposition from a weld wire, the improvement comprising the use of a clean consumable wire electrode of low alloy high strength steel filler metal, the electrode having a moisture-free, flexible surface coating of a material comprising a mixture of chlorinated rubber and chlorinated paraffin which imparts substantially no hydrogen to a weld during welding, feeding the electrode towards a workpiece while maintaining an arc between the end of the electrode and the workpiece with direct current reverse polarity electrical energy, and maintaining the arc under a blanket of air-quenched flux particles, the welding being conducted with substantially no preheating of the workpiece.

6. In a method of electrically welding low alloy high strength steel by fusion-deposition from a weld wire, the improvement comprising the use of a clean consumable wire electrode of low alloy high strength steel filler metal, the electrode having a moisture-free, flexible surface coating of a material comprising a mixture of chlorinated rubber and chlorinated paraffin which imparts substantially no hydrogen to a weld during welding, feeding the electrode towards a workpiece while maintaining an arc between the end of the electrode and the workpiece with direct current reverse polarity electrical energy, and maintaining the arc under a blanket of air-quenched flux particles, the welding being conducted with substantially no preheating of the workpiece.

7. A metallic weld wire for welding high strength low alloy steel comprising a clean consumable wire electrode of high strength low alloy steel filler metal having on the surface thereof a substantially continuous moisture-free flexible coating of material comprising a mixture of chlorinated rubbers and chlorinated resin which imparts substantially no hydrogen to a weld during welding.

8. A metallic weld wire for welding high strength low alloy steel comprising a clean consumable wire electrode of high strength low alloy steel filler metal having on the surface thereof a substantially continuous moisture-free flexible coating of material comprising a mixture of chlorinated rubber and chlorinated paraffin which imparts substantially no hydrogen to a weld during welding.

9. The weld wire of claim 8, wherein the moisture free flexible coating comprises a mixture of chlorinated rubber, 70% chlorinated, and chlorinated paraffin, 40% chlorinated.

10. A method of preparing a weld wire comprising the steps of forming steel filler metal into wire, cleaning the wire surface to remove surface impurities, removing surface irregularities from the wire, treating the wire surface with at least one organic solvent to remove moisture and residual surface impurities, applying to the wire surface a substantially anhydrous organic solvent solution of a moisture-free flexible coating material comprising a mixture of chlorinated rubbers and chlorinated resins with imparts substantially no hydrogen to a weld during welding, and removing the organic solvent from the wire surface by drying to provide a moisture-free flexible continuous coating.

11. The method of claim 10, wherein the solvent solution of coating material is a solution of mixed chlorinated rubbers and chlorinated resins in a solvent comprising xylene and toluene.

12. The method of claim 11, wherein the solvent solution of coating material contains about 1 to about 7% coating solids, by weight.

13. A method of preparing a weld wire comprising the steps of forming steel filler metal into wire, cleaning the wire surface to remove surface impurities, removing surface irregularities from the wire, treating the wire surface with at least one organic solvent to remove moisture and residual surface impurities, applying to the wire surface a substantially anhydrous organic solvent solution of a moisture-free flexible coating material comprising a mixture of chlorinated rubber and chlorinated paraffin which imparts substantially no hydrogen to a weld during welding, and removing the organic solvent from the wire surface by drying to provide a moisture-free-flexible continuous coating.

References Cited

UNITED STATES PATENTS

| | | | |
|---|---|---|---|
| 455,529 | 7/1891 | Coffin | 134—15 |
| 2,011,706 | 8/1935 | Blumberg | 117—202 |
| 2,158,984 | 5/1938 | Lytle et al. | 117—128 |
| 2,231,370 | 7/1938 | Reid | 117—160 |
| 2,237,315 | 4/1941 | Reilly | 117—128 |
| 2,249,017 | 7/1941 | Lytle | 117—202 |
| 2,394,550 | 2/1946 | Jensen | 117—202 |
| 2,421,594 | 6/1947 | Boot | 117—204 |
| 2,870,047 | 1/1959 | Kee | 117—202 |
| 2,945,942 | 7/1960 | Flynn et al. | 219—137 |
| 2,948,805 | 8/1960 | Berg et al. | 219—137 |
| 2,996,484 | 8/1961 | Martin | 117—128 |
| 3,004,872 | 10/1961 | Stark | 117—202 |

FOREIGN PATENTS 2,109 4/1959 Japan.

OTHER REFERENCES

Henley, "Twentieth Century Book of Formulas, Process and Trade Secrets," Henley Publishing Co., 1947–T49H6, p. 200, relied on. Copy in Group 170.

Pelczar Jr., "Manual of Microbiological Methods," 1957, McGraw-Hill Book Co., QR65S6 p. 25 relied on, Copy in Group 170.

Smith, "Vinyl Resins," Reinhold Pub. Co., 1958, pp. 33 and 123, relied on (86V48S55). Copy in Group 160.

RICHARD M. WOOD, *Primary Examiner.*

J. G. SMITH, *Assistant Examiner.*

UNITED STATES PATENT OFFICE
CERTIFICATE OF CORRECTION

Patent No. 3,377,461                                April 9, 1968

John T. Ballass et al.

It is certified that error appears in the above identified patent and that said Letters Patent are hereby corrected as shown below:

Column 1, before line 12, insert as a heading -- ABSTRACT OF THE DISCLOSURE --. Column 6, lines 38 and 39, "little or" should read -- substantially --; line 68, "rubber and chlorinated paraffin" should read -- rubbers and chlorinated resins --.

Signed and sealed this 9th day of September 1969.

(SEAL)
Attest:

Edward M. Fletcher, Jr.                 WILLIAM E. SCHUYLER, JR.
Attesting Officer                           Commissioner of Patents